(12) United States Patent
Balasubramanyan et al.

(10) Patent No.: US 8,055,496 B2
(45) Date of Patent: Nov. 8, 2011

(54) ENSURING PRODUCT CORRECTNESS IN A MULTILINGUAL ENVIRONMENT

(75) Inventors: Balaji Balasubramanyan, Redmond, WA (US); Dmitri Davydok, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 11/933,554

(22) Filed: Nov. 1, 2007

(65) Prior Publication Data

US 2009/0119092 A1     May 7, 2009

(51) Int. Cl.
*G06F 17/20*     (2006.01)
(52) U.S. Cl. .............................. 704/8; 717/170; 717/175
(58) Field of Classification Search ...... 704/8; 717/170, 717/175
See application file for complete search history.

(56) References Cited

U.S. PATENT DOCUMENTS

| | | | |
|---|---|---|---|
| 5,307,265 A | 4/1994 | Winans | |
| 5,493,606 A | 2/1996 | Osder et al. | |
| 5,974,372 A | 10/1999 | Barnes et al. | |
| 6,061,685 A * | 5/2000 | Fantenberg | 709/208 |
| 6,092,036 A | 7/2000 | Hamann | |
| 6,247,128 B1 * | 6/2001 | Fisher et al. | 713/100 |
| 6,442,516 B1 | 8/2002 | Lee et al. | |
| 6,507,813 B2 | 1/2003 | Veditz et al. | |
| 6,654,950 B1 * | 11/2003 | Barnishan | 717/136 |
| 6,718,549 B1 | 4/2004 | Narin et al. | |
| 6,907,546 B1 | 6/2005 | Haswell et al. | |
| 7,178,142 B2 | 2/2007 | Bennett et al. | |
| 7,219,101 B2 * | 5/2007 | Dorsey | 1/1 |
| 2002/0162090 A1 * | 10/2002 | Parnell et al. | 717/120 |
| 2006/0184356 A1 | 8/2006 | Kim et al. | |
| 2006/0210026 A1 * | 9/2006 | Duplessis et al. | 379/88.05 |
| 2007/0150500 A1 * | 6/2007 | Kawada et al. | 707/101 |
| 2008/0082974 A1 * | 4/2008 | Ellison | 717/170 |
| 2008/0254769 A1 * | 10/2008 | Deshpande | 455/412.1 |
| 2009/0100404 A1 * | 4/2009 | Chaturvedi et al. | 717/101 |

OTHER PUBLICATIONS

Drepper, Ulrich et al., "GNU Gettext Tools, Version 0.16.1," Native Language Support Library and Tools, Edition 0.16.1, Nov. 26, 2006.
"You Receive a 'The upgrade patch cannot be installed by the Windows Installer service because the program to be upgraded may be missing' when you try to install a BizTalk Server 2004 service pack or other product update," Copyright 2007 Microsoft Corporation (1 page) http://support.microsoft.com/kb/895294 [Accessed Oct. 16, 2007].
Frequently Asked Questions, Windows Server 2003, Windows XP & Windows 2000 MUI, Copyright 2007 Microsoft Corporation (6 pages) http://www.microsoft.com/globaldev/DrIntl/faqs/MUIFaq.mspx [Accessed Oct. 16, 2007].

* cited by examiner

*Primary Examiner* — Jakieda Jackson
(74) *Attorney, Agent, or Firm* — Perkins Coie LLP

(57) ABSTRACT

A language package system that prevents undesirable behaviors resulting from an incompatibility between a core package of a software product and its language packages is provided. The language package system executes when a user starts the execution of the core package on a computing device. The language package system retrieves a language package version number from the core package that indicates the version number of compatible language packages and an indication of the preferred language of the user. The language package system then determines whether the computing device has a compatible language package that is available. When the computing device has a compatible language package, the software product uses that language package. When the computing device has no compatible language package, the language package system then performs processing that factors in the unavailability of a compatible language package.

20 Claims, 4 Drawing Sheets

ENSURING PRODUCT CORRECTNESS IN A MULTILINGUAL ENVIRONMENT

BACKGROUND

To reach as wide a market as possible, software products are often designed so that their user interface can be provided in many different languages. An end user who uses the software product can specify their preferred language. When the software product executes, it identifies the preferred language (e.g., from a configuration store) and provides the user interface in that language if that language is supported by the software product. To support multiple languages, a software product may include a core package that implements the core functionality of the product and a language package for each of the supported languages. A language package contains the user interface elements for a particular language. These user interface elements are referred to as resources, and each resource has a resource identifier. When the core package executes, it retrieves the user interface elements from the language package of the preferred language.

When a software product is initially installed on a computing device, the core package and many different language packages may be installed. In such a case, the core package is likely to be fully compatible with the language packages. However, after initial installation, the core package and the language packages may be updated independently, which may result in an incompatibility between the core package and the language packages. For example, a service package may be provided to update the core package, and other service packages may be provided to update the language packages. The update to the core package may provide a new user interface element, and the updates to the language packages may provide that user interface element in the appropriate languages. If a user applies the service package for the core package, but not the service packages for the language packages, then the core package will not be able to correctly display the new user interface element. Indeed, the core package may exhibit an undesirable behavior when it attempts to retrieve that user interface element from a language package that has not been updated. This undesirable behavior may include terminating execution of the software product abnormally, overwriting of data, displaying of gibberish, and so on.

SUMMARY

A language package system that prevents undesirable behaviors resulting from an incompatibility between a core package of a software product and its language packages is provided. The language package system executes when a user starts the execution of the core package on a computing device. The language package system retrieves a language package version number from the core package that indicates the version number of compatible language packages and an indication of the preferred language of the user. The language package system then determines whether the computing device has a compatible language package that is available. When the computing device has a compatible language package, the software product uses that language package. When the computing device has no compatible language package, the language package system then performs processing that factors in the unavailability of a compatible language package. The processing may include simply aborting execution of the core package to prevent any undesirable behavior resulting from the incompatibility, downloading a compatible language package, using a default language package, displaying a standard message from an incompatible language package, and so on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
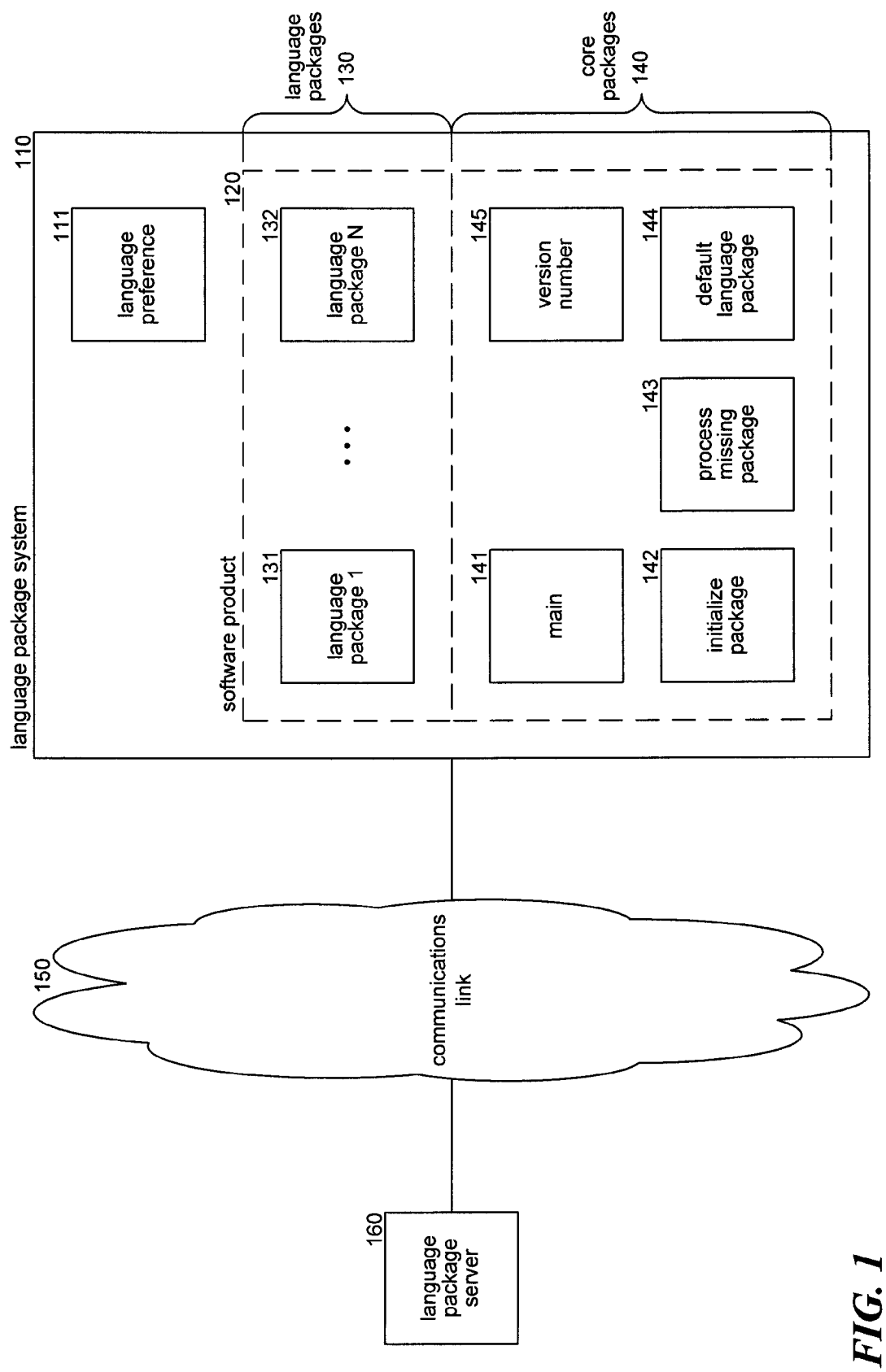
FIG. 1 is a block diagram that illustrates components of the language package system in some embodiments.

A language package system that prevents undesirable behaviors resulting from an incompatibility between a core package of a software product and its language packages is provided. In some embodiments, the language package system executes when a user starts the execution of the core package on a computing device. The language package system retrieves a language package version number from the core package that indicates the version number of compatible language packages. The language package system also retrieves an indication of the preferred language of the user. For example, the language preference may have been established when the user installed the software product on the computing device. The language package system then determines whether the computing device has a compatible language package that is available. A language package is compatible when its language is compatible with the preferred language and its version number is compatible with the language package version number of the core package. Languages may be considered compatible when they are the same or one language is a variation of another. For example, American English may be considered to be compatible with British English. If a language package for American English is not available, then the language package for British English may be used. Version numbers may be considered compatible when they are the same or, possibly when a language package has a higher version number from the core package. When the computing device has no compatible language package, the language package system then performs processing that factors in the unavailability of a compatible language package. The processing may include simply aborting execution of the core package to prevent any undesirable behavior resulting from the incompatibility. In this way, the otherwise undesirable behavior resulting from the unavailability of a compatible language package is avoided.

In some embodiments, the language package system may, when a compatible language package is not available, use a default language package that is included with the core package. The core package may include a language package in a default language. Whenever the core package is updated, the default language package is updated as appropriate. In addition, the default language package is distributed as part of the core package and may be considered to be an internal language package (with the other language packages being external language packages). Thus, the default language package will always be available to the core package since it is part of it and distributed and updated with it. During execution of the software product, the language package system may identify that there is no compatible external language package available. If so, then the software product can use the default language package. Although the language of the default language package may not be the preferred language, the execution of the software product will not exhibit any undesired behavior other than the use of a nonpreferred language.

In some embodiments, the language package system may, when a compatible language package is not available, attempt to download a compatible language package from a server onto the computing device. The language package system may ask the user whether a language package for the preferred language should be downloaded. If the user indicates that a language package should be downloaded, then the language package system may provide the identification of the software product, the language package version number of the core package, and the preferred language to a language package server. The language package server may retrieve a compatible language package and send it to the computing device. The execution of the software product can then continue using the downloaded language package. Since a compatible language package has now been installed on the computing device, subsequent execution of the software product will detect and use the compatible language package. If the download is for some reason not successful (e.g., network connection is down), then the language package system may use the default language package of the core package if available.

In some embodiments, the language package system may define a standard error message that is included within each language package irrespective of its version number. The standard error message is assigned a distinguished identifier or resource ID that is used in each language package. For example, the standard error message may be "Unable to locate a compatible language file—The execution of the software product will default to a standard language," when the behavior is to use a default language package. The distinguished identifier may be a certain number such as 100. When the language package system determines that a compatible language package is not available, the language package system can retrieve the appropriate standard error message from any language package for the preferred language and display it to the user. The language package system may define multiple standard error messages to account for different ways in which the unavailability of a compatible language package is handled. For example, the language package system may specify standard error messages to control the downloading of a compatible language package.

FIG. 1 is a block diagram that illustrates components of the language package system in some embodiments. A computing device on which the language package system 110 executes may be connected to a language package server 160 and other servers via a communications link 150. The language package system may be implemented as part of a software product 120. The software product includes language packages 130 and a core package 140. The language packages may include a language package 131 and a language package 132. Each language package includes an identification of its language along with its version number. The core package may conclude a main component 141, an initialize package component 142, a process missing package component 143, a default language package 144, and a version number 145. The version number identifies the version number of compatible language packages. The main component performs the main processing of the software product and invokes the initialize package component during initialization. The initialize package component determines whether a compatible language package is available at the computing device. If so, that language package is used during execution of the software product. If not, then the initialize package component invokes the process missing package component to determine how to handle the unavailability of a compatible language package. The process missing package component may attempt to download a compatible language package or may use the default language package of the core package.

Figure 2:
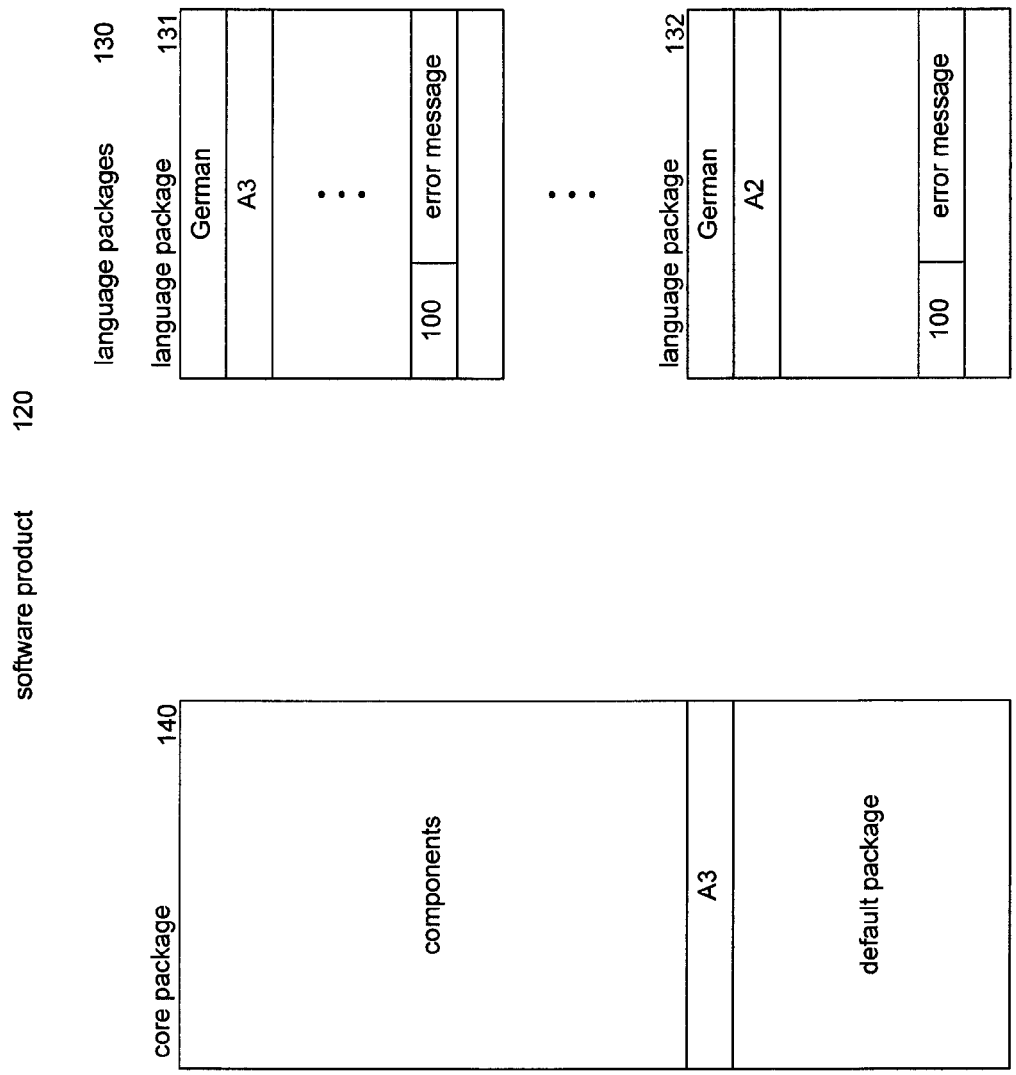
FIG. 2 is a block diagram that illustrates data of the software product in detail.

FIG. 2 is a block diagram that illustrates data of the software product in detail. The software product 120 includes language packages 130 and the core package 140. Each language package includes an identification of its language and its version number. The language package 131 is for the German language and has the version number of "A3." The language package 132 is also for the German language but has the version number of "A2." The core package has a version number of "A3." Thus, the core package may be compatible with the language package 131 but incompatible with the language package 132. Each language package also has a standard error message with the distinguished identifier of 100. If the language package 131 was inadvertently deleted from the computing device, then when the software product executes with the preferred language of German, it will attempt to find a compatible language package. However, it will detect that the language package 132 is not compatible because the version numbers do not match. Nevertheless, the language package system will retrieve the error message from the language package 132 and display it to the user. In this way, the language package system will present some indication of the problem in the preferred language of the user.

The computing device on which the language package system is implemented may include a central processing unit, memory, input devices (e.g., keyboard and pointing devices), output devices (e.g., display devices), and storage devices (e.g., disk drives). The memory and other storage devices are tangible computer-readable media that may be encoded with computer-executable instructions that implement the language package system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The language package system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
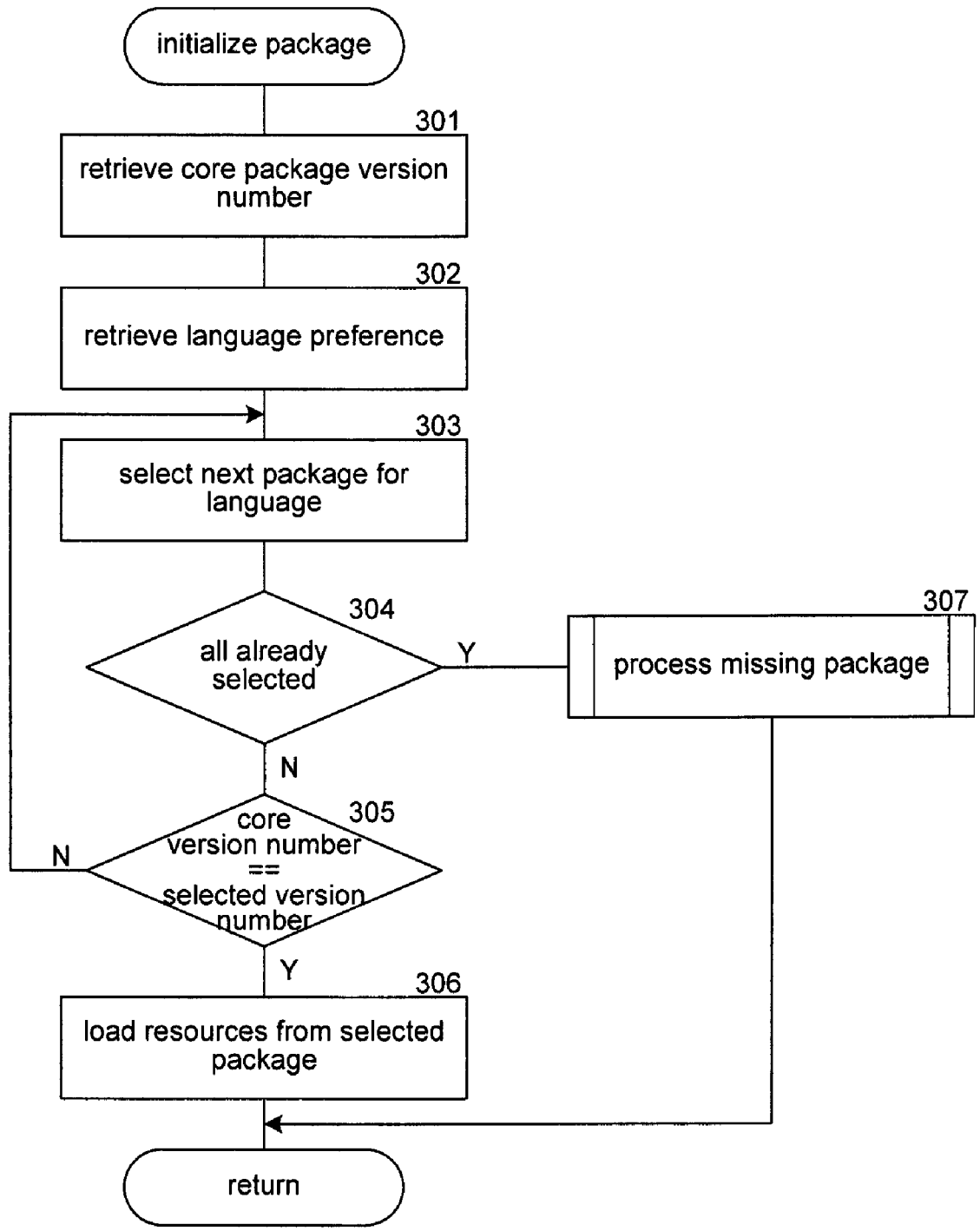
FIG. 3 is a flow diagram that illustrates the processing of the initialize package component of the language package system in some embodiments.

FIG. 3 is a flow diagram that illustrates the processing of the initialize package component of the language package system in some embodiments. The component is invoked during initialization of the software product. The component determines whether a compatible language package is available. If not, it performs processing to prevent any undesired and unexpected behavior by the software product. In block 301, the component retrieves the version number of the compatible language packages from the core package. In block 302, the component retrieves an indication of the preferred language of the user. In blocks 303-305, the component loops determining whether there is a compatible language package available at the computing device. In block 303, the component selects the next language package for the preferred language. In decision block 304, if all such language packages have already been selected, then a compatible language package is not available and the component continues at block 307, else the component continues at block 305. In decision block 305, if the version number of the core package is compatible with the version number of the selected language package, then the component continues at block 306, else the component loops to block 303 to select the next language package. In block 306, the component loads the resources from the selected language package and returns to continue execution of the software product with the loaded resources. In block 307, the component invokes the process missing package component and then returns to continue execution with any loaded resources.

Figure 4:
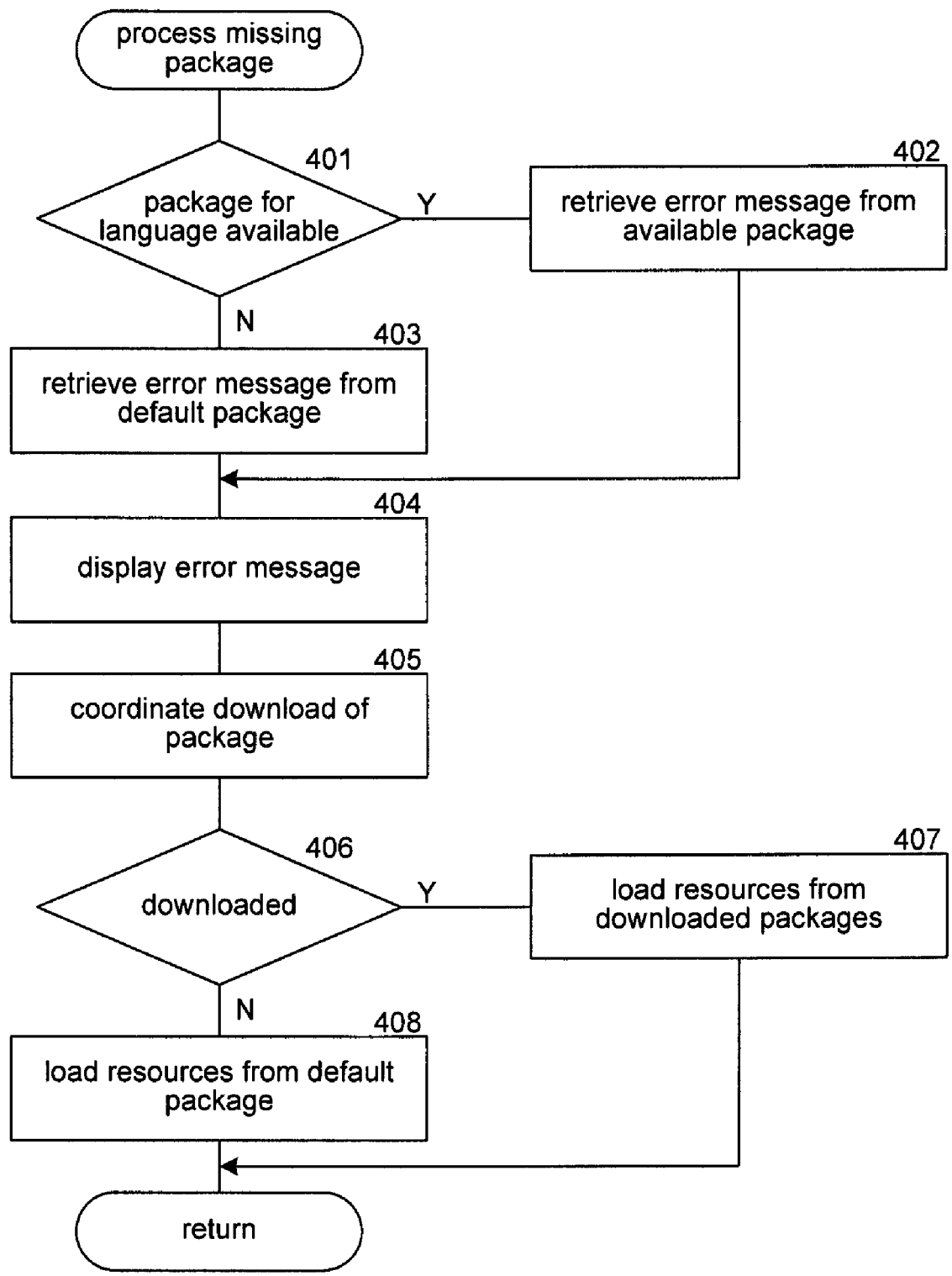
FIG. 4 is a flow diagram that illustrates the processing of the process missing package component of the language package system in some embodiments.

FIG. 4 is a flow diagram that illustrates the processing of the process missing package component of the language package system in some embodiments. In this example, the component displays an error message in the preferred language if possible and attempts to download a compatible language package. If a compatible language package cannot be downloaded, then the component uses the default language package of the core package. In decision block 401, if a language package for the preferred language is available, then the component continues at block 402, else the component continues at block 403. In block 402, the component retrieves the standard error message from the available package. In block 403, the component retrieves the standard error message from the default package. In block 404, the component displays the retrieved error message. In block 405, the component coordinates the download of a compatible language package. In decision block 406, if a compatible language package was downloaded, then the component continues at block 407, else the component continues at block 408. In block 407, the component loads the resources from the downloaded package and then returns. In block 408, the component loads resources from the default package and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for accessing resources of a language package for a software product, the method comprising:
providing language packages, each language package having a version number and a language;
retrieving a language package version number of the software product that indicates the version number of language packages that are compatible with the software product;
retrieving a language preference associated with a user of the computing device;
for each of a plurality of language packages,
determining whether the language package has a language that is compatible with the retrieved language preference and has a version number that is compatible with the retrieved language package version number of the software product; and
upon determining that the language package has a language that is compatible with the retrieved language preference and has a version number that is compatible with the retrieved language package version number of the software product, indicating to use that language package during execution of the software product; and
upon determining that no language package has a language that is compatible with the retrieved language preference and has a version number that is compatible with the retrieved language package version number of the software product, performing processing to prevent otherwise undesirable behavior resulting from the unavailability of a compatible language package.

2. The method of claim 1 wherein the software product includes a default language package and the performing of the processing includes indicating to use the default language package during execution of the software product.

3. The method of claim 1 wherein the performing of processing includes downloading to the computing device a language package with a language that is compatible with the retrieved language preference and with a version number that is compatible with the retrieved language package version number.

4. The method of claim 3 wherein the language package is downloaded when the user approves of the downloading.

5. The method of claim 1 wherein each language package includes an error message with a distinguished identifier and the performing of the processing includes retrieving the error message with the distinguished identifier from a language package with a language that is compatible with the retrieved language preference and with a version number that is not compatible with the retrieved language package version number.

6. The method of claim 1 wherein the performing of the processing includes aborting the execution of the software product.

7. The method of claim 1 wherein each language package has a collection of resources and a version number identifying that collection of resources.

8. A computing device for identifying a language package for a software product, comprising:
a component that retrieves a language package version number that is compatible with the software product;
a component that retrieves a language preference associated with a user of a computing device;
a component that indicates to use a language package during execution of the software product when the computing device has a language package with a language that is compatible with the retrieved language preference and with a version number that is compatible with the retrieved language package version number; and
a component that, when the computing device has no language package with a language that is compatible with the retrieved language preference and with a version number that is compatible with the retrieved language package version number, retrieves and displays an error message with a distinguished identifier from a language package with a language that is compatible with the retrieved language preference and with a version number that is not compatible with the retrieved language package version number;

attempts to download to the computing device a language package with a language that is compatible with the retrieved language preference and with a version number that is compatible with the retrieved language package version number;

when the language package is successfully downloaded, indicates to use the downloaded language package during execution of the software product; and when the language package is not successfully downloaded, indicates to use a default language package of the software product.

9. The computing device of claim 8 wherein the default language package is shipped as part of a core package of the software product.

10. The computing device of claim 8 including when a compatible language package is not available, aborting execution of the software product.

11. The computing device of claim 8 wherein each language package has a collection of resources and a version number identifying that collection of resources.

12. A computer-readable storage device containing instructions for controlling a computing device to access resources of a language package for a software product, by a method comprising:

starting execution of the software product; and during execution of the software product, retrieving a language package version number that is compatible with the software product;

retrieving a language preference associated with a user of the computing device;

when the computing device has a language package with a language that is compatible with the retrieved language preference and with a version number that is compatible with the retrieved language package version number, indicating to use that language package during execution of the software product and continuing with execution of the software product; and when the computing device has no language package with a language that is compatible with the retrieved language preference and with a version number that is compatible with the retrieved language package version number, aborting execution of the software product.

13. The computer-readable storage device of claim 12 wherein when the software product includes a default language package, the method further comprises indicating to use that language package, rather than aborting the execution of the software product.

14. The computer-readable storage device of claim 12 wherein when the computing device has no language package with a language that is compatible with the retrieved language preference and with a version number that is compatible with the retrieved language package version number, the method further comprises downloading to the computing device a language package with a language that is compatible with the retrieved language preference and with a version number that is compatible with the retrieved language package version number, rather than aborting execution of the software product.

15. The computer-readable storage device of claim 12 wherein each language package includes a message with a distinguished identifier and the method further comprises, prior to aborting execution of the software product, retrieving and displaying the message with the distinguished identifier from a language package with a language that is compatible with the retrieved language preference and with a version number that is not compatible with the retrieved language package version number.

16. The computer-readable storage device of claim 12 wherein each language package has a collection of resources and a version number identifying that collection of resources.

17. The computer-readable storage device of claim 12 wherein the method further comprises: when the software product includes a default language package, indicating to use that language package, rather than aborting the execution of the software product; and when the computing device has no language package with a language that is compatible with the retrieved language preference and with a version number that is compatible with the retrieved language package version number, downloading to the computing device a language package with a language that is compatible with the retrieved language preference and with a version number that is compatible with the retrieved language package version number, rather than aborting execution of the software product.

18. The computer-readable storage device of claim 17 wherein each language package includes a message with a distinguished identifier and the method further comprises, prior to aborting execution of the software product, retrieving and displaying the message with the distinguished identifier from a language package with a language that is compatible with the retrieved language preference and with a version number that is not compatible with the retrieved language package version number.

19. The computer-readable storage device of claim 12 wherein each language package includes a message with a distinguished identifier and the method further comprises, prior to aborting execution of the software product, retrieving and displaying the error message with the distinguished identifier from a language package with a language that is compatible with the retrieved language preference and with a version number that is not compatible with the retrieved language package version number; and wherein when the software product includes a default language package, indicating to use that language package, rather than aborting the execution of the software product.

20. The computer-readable storage device of claim 19 wherein the method further comprises: when the computing device has no language package with a language that is compatible with the retrieved language preference and with a version number that is compatible with the retrieved language package version number, downloading to the computing device a language package with a language that is compatible with the retrieved language preference and with a version number that is compatible with the retrieved language package version number, rather than aborting execution of the software product.

* * * * *